(12) United States Patent
Mola et al.

(10) Patent No.: US 9,388,858 B2
(45) Date of Patent: Jul. 12, 2016

(54) FLANGED RADIAL BEARING WITH ROLLING ELEMENTS

(71) Applicants: Roberto Mola, Turin (IT); Matteo Pastorino, Airasca (IT); Riccardo Restivo, Turin (IT); Gianpiero Scaltriti, Turin (IT)

(72) Inventors: Roberto Mola, Turin (IT); Matteo Pastorino, Airasca (IT); Riccardo Restivo, Turin (IT); Gianpiero Scaltriti, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/496,282

(22) Filed: Sep. 25, 2014

(65) Prior Publication Data

US 2015/0086147 A1    Mar. 26, 2015

(30) Foreign Application Priority Data

Sep. 25, 2013  (IT) .................................. TO13A0772

(51) Int. Cl.
*F16C 33/58*  (2006.01)
*F16C 35/04*  (2006.01)

(52) U.S. Cl.
CPC ............. *F16C 33/586* (2013.01); *F16C 35/045* (2013.01)

(58) Field of Classification Search
CPC ....... F16C 35/042; F16C 35/045; F16C 35/06
See application file for complete search history.

(56) References Cited

U.S. PATENT DOCUMENTS

| 3,767,279 | A | * | 10/1973 | Hallerback | ........... F16C 33/768 384/539 |
| 4,025,135 | A |   | 5/1977  | Hishida    |                                 |
| 4,423,540 | A |   | 1/1984  | Hishida    |                                 |
| 4,511,191 | A | * | 4/1985  | Kitamura   | .............. F16C 35/067 384/536 |
| 4,925,322 | A | * | 5/1990  | Hishida    | ................. F16C 13/006 384/486 |
| 6,412,985 | B1 | * | 7/2002 | Schweitzer | ............. F16B 21/18 384/537 |
| 6,715,925 | B2 | * | 4/2004 | Pairone    | ................... D06F 37/00 384/255 |
| 8,091,240 | B2 | * | 1/2012 | Katougi    | ................ F16C 33/586 29/505 |
| 8,668,392 | B2 | * | 3/2014 | Maldera    | ................ F16C 19/497 384/542 |

FOREIGN PATENT DOCUMENTS

| DE | 7330413     | U  | 11/1973 |
| DE | 10355407    | B3 | 5/2005  |
| DE | 102004053078 | A1 | 5/2006  |
| EP | 1801438     | A1 | 6/2007  |
| JP | 2000074079  | A  | 3/2000  |

* cited by examiner

Primary Examiner — Thomas R. Hannon
(74) Attorney, Agent, or Firm — Bryan Peckjian; SKF USA Inc. Patent Dept.

(57) ABSTRACT

Flanged radial bearing with rolling elements provided with an outer ring radially defined by an outer surface; an inner ring mounted inside and coaxially with the outer ring; a row of rolling elements between the two rings to allow the two rings to rotate relative to one another; and a flange secured to the outer ring and located in correspondence of an assembly groove made around said outer surface; the flange being assembled, in such a way that it cannot be disengaged, to the outer ring.

7 Claims, 2 Drawing Sheets

FLANGED RADIAL BEARING WITH ROLLING ELEMENTS

CROSS REFERENCE TO RELATED APPLICATION

This is a National Stage application claiming the benefit of Italy Patent Application Number TO2013A000772 filed on 25 Sep. 2013 (25 Sep. 2013), which is incorporated herein by reference in its entirety.

TECHNICAL FIELD

The present invention is related to a flanged rolling bearing.

BACKGROUND ART

Flanged radial bearings are known and comprise an outer ring and an inner ring, co-axial one another, a row of rolling elements between the two rings, to allow the two rings to rotate relative to one another, and a flange, secured to the outer ring, made in one piece and with the same material of said outer ring.

Since the above described flange is in one piece with the outer ring, a bearing flexible use is limited. In fact, some different applications could require flanges having different features, e.g. shape, material, but outer and inner rings having same performances and technical features.

Therefore, even if the same bearing (rings and rolling elements) can be used in different applications, whenever these applications require different flanges, it is mandatory to equip bearing production lines, so as to produce at least the outer ring and the flange according to the specific application.

Such a modus operandi is not according to more and more stringent standardization requirements for the majority of components, production cost savings, flexibility of products and related production lines.

INVENTION SUMMARY

Aim of the present invention is to realize a flanged radial bearing with rolling elements, which is very flexible in its applications, overcoming the above described inconveniences.

According to the present invention, a flanged radial bearing with rolling elements is realized, the flanged radial bearing having the characteristics as in the enclosed independent claim.

Further embodiments of the invention, preferred and/or particularly advantageous, are described according to the characteristics as in the enclosed dependent claims

BRIEF DESCRIPTION OF THE DRAWINGS

A preferred embodiment of the invention will be now described, in an exemplifying and not limitative way, by reference to the enclosed drawing, in which.

DETAILED DESCRIPTION

Figure 1:
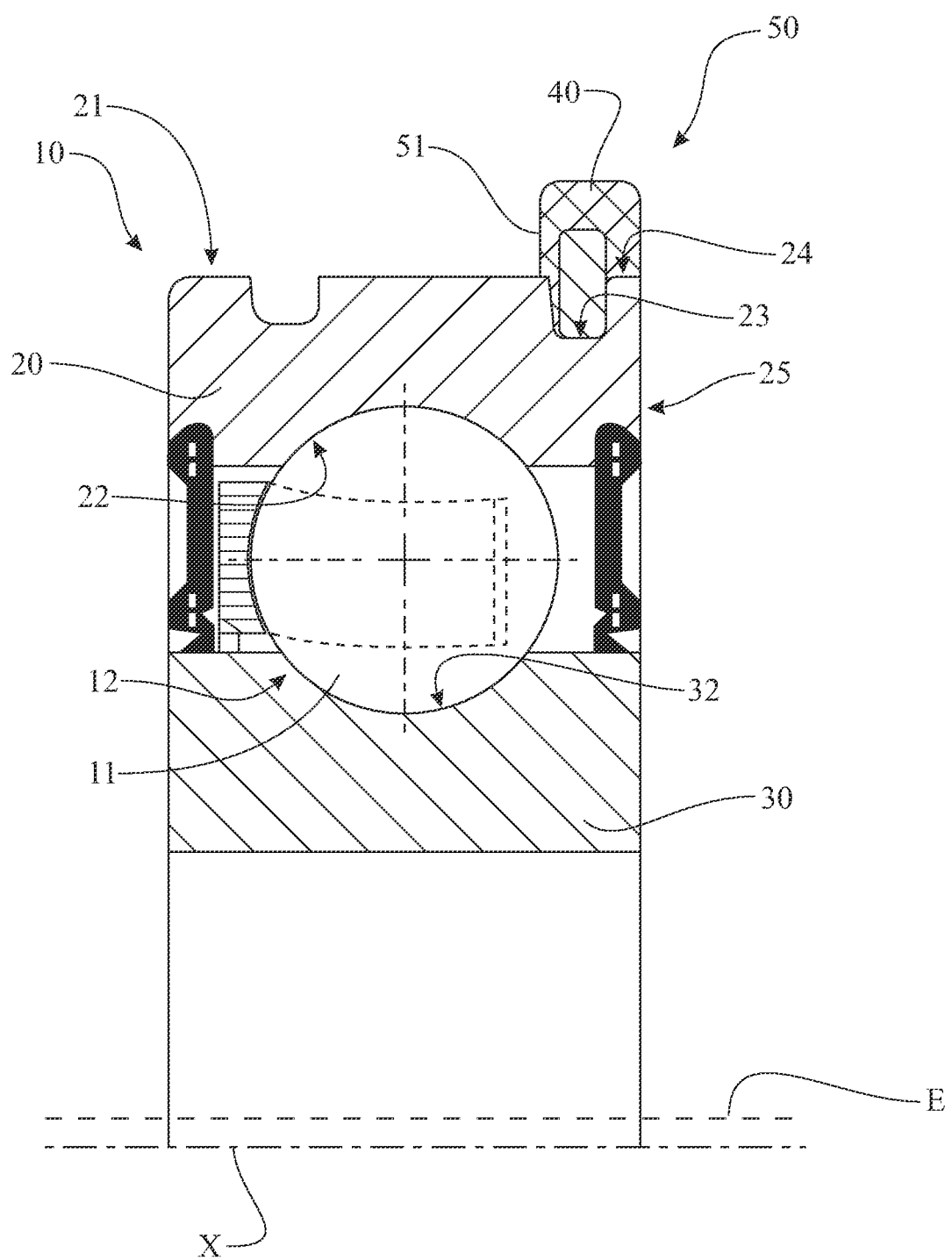
FIG. 1 is an axial section of a preferred embodiment of the flanged radial bearing according to the present invention.
Figure 2:
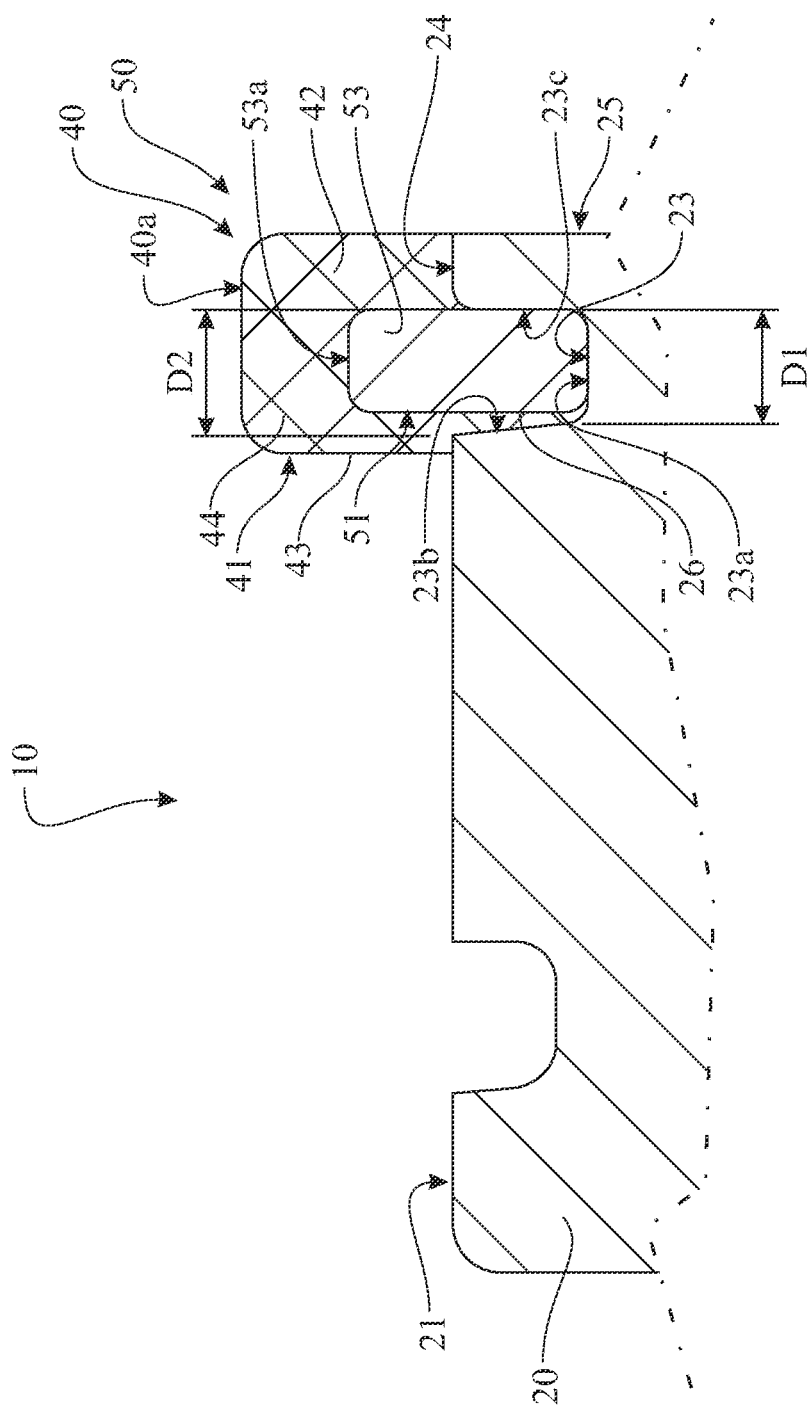
FIG. 2 is a section, in an enlarged scale, of a detail of the bearing of FIG. 1.

With reference to FIGS. 1 and 2, with 10 is referenced as a whole a flanged radial bearing with rolling elements 11, in particular spheres.

The bearing 10 has a central axis X of rotation, and comprises:

an outer ring 20, which is radially defined by an external cylindrical surface 21 and axially defined by an annular front surface 25, transversal to the axis X, and is provided with an inner rolling race 22;

an inner ring 30, which is co-axially assembled inside the outer ring 20 and is provided with an outer rolling race 32;

a row 12 of rolling elements 11 inside the rolling races 22, 32 to allow the two rings 20, 30 to rotate relative to one another To assemble the bearing 10 to external mechanical elements (for example, to assemble the bearing 10 to a gear box carter) or in all applications where the bearing 10 must be axially locked, said bearing also comprises a flange 50. The flange is steadily fixed to the outer ring 20, and radially projects out from the external surface 21, transversally to the axis X.

The flange 50 is not in one piece with the outer ring, in other words is not integral nor made of the same material of the outer ring. On the contrary, the flange 50 is dismountable assembled on the outer ring 20, in correspondence of an assembly groove 23, which is obtained in the outer ring 20, through the external surface 21 and defines on said external surface 21 an annular mounting edge 24. The annular edge 24 has an axial dimension, which is equal to, but not smaller than an axial dimension of the groove 23, and is axially defined, at an axially internal side of the outer ring 20, by said groove 23 and, at an axially external side of the outer ring 20, by the front surface 25.

According to FIG. 2, the assembly groove 23 is provided with a cylindrical bottom surface 23a, located around a correspondent central axis E, which is parallel but different from the central axis X, and being axially defined by two side surfaces 23b, 23c. Said side surfaces are located one another at least at a minimum predetermined distance.

In other words, the bottom surface 23a is eccentric with respect to the external surface 21 of the bearing 10, while the side surface 23c is orthogonal to the central axis X and the side surface 23b is inclined with respect to said central axis X. In this way, it is possible to obtain a flared shape to the assembly groove 23, a minimum axial distance D1 of said assembly groove 23 in correspondence of the bottom surface 23a and a maximum axial distance D2 of the assembly groove 23 in correspondence of the surface 21.

As it will be better described hereafter, since the flange 50 is assembled to the outer ring 20 independently from the kind of used outer ring 20, it is possible to use the same outer ring 20, together with the correspondent inner ring 30, for different applications, which need different flanges 50. Even if the applications require different dimensions for the flange, the more appropriate flange 50 can be assembled on the outer ring 20. In other words, the bearing production line can always be the same, independently from the specific application of said bearing, being sufficient at the end of the production process, to associate to the bearing 10 a dedicated flange 50 for the specific application. This implies remarkable cost savings and also lean production procedures and a wider production standardization.

The flange 50 comprises:

structural mounting means, e.g. a structural mounting element 40, located around the outer ring 20 in correspondence of the assembly groove 23, so that the bearing 10 may be assembled using external mechanical means, and a ring 51, preferably an elastic ring made of metal or plastic or elastomeric material, which is inserted in the assembly groove 23 and immersed inside the structural mounting element 40, to anchor the flange 50 to the outer ring 20.

The ring 51 can be a "seeger" type, or a retaining ring made of elastic steel, having a not complete circumference, and is only partially inserted inside the assembly groove 23, being provided with a projecting annular portion 53, which radially projects out from said assembly groove 23 and is radially defined by a cylindrical surface 53a. The radial dimensions of the projecting annular portion 53, so as the radial overall dimensions of the ring 51 are chosen according to the bearing 10 specific application, since the ring 51, other than anchoring the flange 50 to the outer ring 20, is also an internal reinforcement of the structural element. 40.

The ring 51 has an axial thickness, that is radially constant and with a smaller dimension than the dimension of the minimum axial distance D1 between the surfaces 23b and 23c; the ring 51 is located inside the assembly groove 23 close to the surface 23c and in contact with the bottom surface 23a. With the above described geometrical features of the assembly groove 23 and the ring 51, between the surface 23b and the ring 51 a radially flared seat 26 is obtained, said seat 26 being open in correspondence of the surface 21.

The structural mounting element 40 comprises a plastic single body 41, having an axial dimension greater than the maximum axial dimension D2 of the assembly groove 23 and radial dimensions, starting from the surface 21, greater than radial dimensions of the annular projecting portion 53, that projects radially out from the assembly groove 23. The structural element 40 is realized by co-molding the plastic single body 41 around the outer ring 20 and the ring 51 and, therefore, the latter ring 51 is not only completely immersed inside said single body 41, but also completely locked inside the assembly groove 23 without any movement possibility, both axial and circumferential, as will be better explained hereafter.

In the embodiment, shown in FIG. 1, the single body 41 stands above the ring 51, completely covering the cylindrical surface 53a, and, due to the eccentricity of the bottom surface 23a of the assembly groove 23 (also determining as well an eccentric assembly of the ring 51 around the axis X), completely locks any possible movement around said axis X. In other words, the eccentricity of the bottom surface 23a of the assembly groove 23 and the consequent eccentricity of the ring 51 are anti-rotational means for both the ring 51 and the single body 41, that is to say, for the structural element 40, whose radially external surface 40a is co-axial to the surface 23a and is cylindrical shaped.

The single body 41 comprises a front annular portion 42, in contact with the annular mounting edge 24 and aligned to the surface 25, and a rear annular portion 43, which is substantially in contact with the surface 21 and projects inside the seat 26 of the assembly groove 23. The insertion of the rear annular portion 43 into the seat 26 takes place during the co-molding of the single body 41 and the inclination of the surface 23b is needed to make easier the flow of plastic material inside said seat 26 during the co-molding. Finally, the single body 41 comprises a central annular portion 44, located between the front annular portion 42 and the rear annular portion 43, close to the surface 53a and externally defined by the surface 40a. Since the surface 53a is co-axial to the axis X, while the surface 23a is co-axial to the axis E, the central annular portion 44 has a radial thickness which is not constant around the axis X, to compensate the eccentricity of the ring 51.

To assemble the bearing 10 to said external mechanical elements, the single body 41 can be or cannot be provided with through holes (not shown) or can be shaped in a suitable way, with respect to the specific application, during the co-molding. Also the overall dimensions of the single body 41 will be chosen according to the specific application, without any influence on the dimensions of the rings 20 and 30 and the rolling elements 11.

From what has been above mentioned, it appears evident that the use of a mountable flange 50, better, a co-moldable flange, as the described one, let the use of the bearing 10 be remarkable wider and allows to standardize the rings 20, 30 production, apart from the final use of said bearing 10, with remarkable savings both in time and in production costs.

Other than the embodiments of the invention, as above disclosed, it is to be understood that a vast number of variations exist. It should also be appreciated that the exemplary embodiment or exemplary embodiments are only examples and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

What is claimed is:

1. A flanged radial bearing with rolling elements, the bearing having a first central axis, and comprising:
    an outer ring radially defined by an outer surface;
    an inner ring mounted inside and coaxially with the outer ring;
    a row of rolling elements between the two rings to allow the two rings to rotate relative to one another; and
    a flange secured to the outer ring,
    wherein the outer ring has an assembly groove made around said outer surface, and the flange is assembled, in such a way that it cannot be disengaged, to the outer ring at the assembly groove,
    wherein the assembly groove has a surface with a cylindrical bottom about a respective second central axis that is parallel to but different from the first central axis,
    wherein the flange comprises a structural mounting component placed around the outer ring at the assembly groove so that the bearing may be assembled using an external mechanical attachment element, and an anchoring component partially inserted in the assembly groove and incorporated in the structural mounting component so as to anchor the flange to the outer ring.

2. The flanged bearing according to claim 1, wherein the assembly groove forms, on the outer surface of the outer ring, an annular mounting edge and the assembly groove is axially defined by a first and a second side surface which are located at least a predetermined minimum axial distance from each other.

3. The flanged bearing according to claim 2, wherein the anchoring component comprises a ring that is partially inserted in said assembly groove and has a portion that projects radially out from the assembly groove, wherein the ring is fabricated of at least one of an elastic material and a metal material.

4. The flanged bearing according to claim 3, wherein the predetermined minimum axial distance between the first and second side surfaces is greater than an axial thickness of the elastic ring.

5. The flanged bearing according to claim 3, wherein the structural mounting component comprises a plastic single body of which the axial dimensions are greater than a maximum axial dimension of the assembly groove and of which the radial dimensions are greater than the radial dimensions of the portion that projects radially from the outer surface of the outer ring.

6. Flanged bearing according to claim 5, wherein the plastic single body has a front annular portion which is in contact with the annular mounting edge, and a rear annular portion inserted in the assembly groove between the elastic ring and the first side surface.

7. Flanged bearing according to claim 6, wherein the second side surface is perpendicular to the first central axis and the first side surface is inclined with respect to the first central axis; the minimum axial distance being measured in the position closest to the first central axis.

\* \* \* \* \*